United States Patent
Valiquette

[11] 3,759,248
[45] Sept. 18, 1973

[54] CARDIAC ARRYTHMIA DETECTOR

[75] Inventor: Donley J. Valiquette, Northridge, Calif.

[73] Assignee: Spacelabs, Inc., Van Nuys, Calif.

[22] Filed: Feb. 8, 1971

[21] Appl. No.: 113,331

Related U.S. Application Data

[62] Division of Ser. No. 791,638, Jan. 16, 1969, abandoned.

[52] U.S. Cl..... 128/2.06 A, 128/2.05 R, 128/2.06 F
[51] Int. Cl............................................... A61b 5/04
[58] Field of Search ................. 128/2.06 A, 2.06 F, 128/2.06 R, 2.05 R

[56] References Cited
UNITED STATES PATENTS

| | | | |
|---|---|---|---|
| 3,608,545 | 9/1971 | Novack et al. ................. | 128/2.06 F |
| 3,144,019 | 8/1964 | Haber ............................. | 128/2.06 A |
| 3,438,368 | 4/1969 | Karsh ............................. | 128/2.06 A |

*Primary Examiner*—William E. Kamm
*Attorney*—Robert E. Geauque

[57] ABSTRACT

A system is described to continuously monitor a number of cardiac patients in a hospital. Electrocardiogram probes are placed upon a plurality of patients and simultaneously monitored by this system for changes in the normal electrocardiogram (ECG) waveforms. Each ECG waveform is recorded on a 30 second tape loop delay for retrieval during an alarm condition for a determination of the cause of the alarm. This tape loop also provides a 100 millisecond delay of ECG for correlation monitoring of the QRS complex of the ECG. An R wave trigger is generated and is utilized for R-R interval measurements. A correlation monitor is provided and quantizes the ECG QRS complexes and stores each segment thereof for comparison with subsequent waveforms. The stored waveform provides a running average of several QRS complexes just prior to the complex being compared. A segment element is trained by this running average of the QRS waveform. By comparing each segment of the waveform to the appropriate segment of the stored waveform, a correlation is established. If an aberrant QRS complex is sensed and compared, several points of difference will be detected. The R-R interval is simultaneously compared on a running average to assist in establishing a premature ventricular contraction of the patient. A photoplethysmograph is provided to monitor mechanical heart action. The signals provided by the R-R interval monitor, a change in the QRS complex, pulse signals provided by the photoplethysmograph and the heart rate of the patient provide certain criteria which are monitored by a logic circuit to provide a minor alarm on certain criteria and a major alarm on any combination of the waveforms.

20 Claims, 13 Drawing Figures

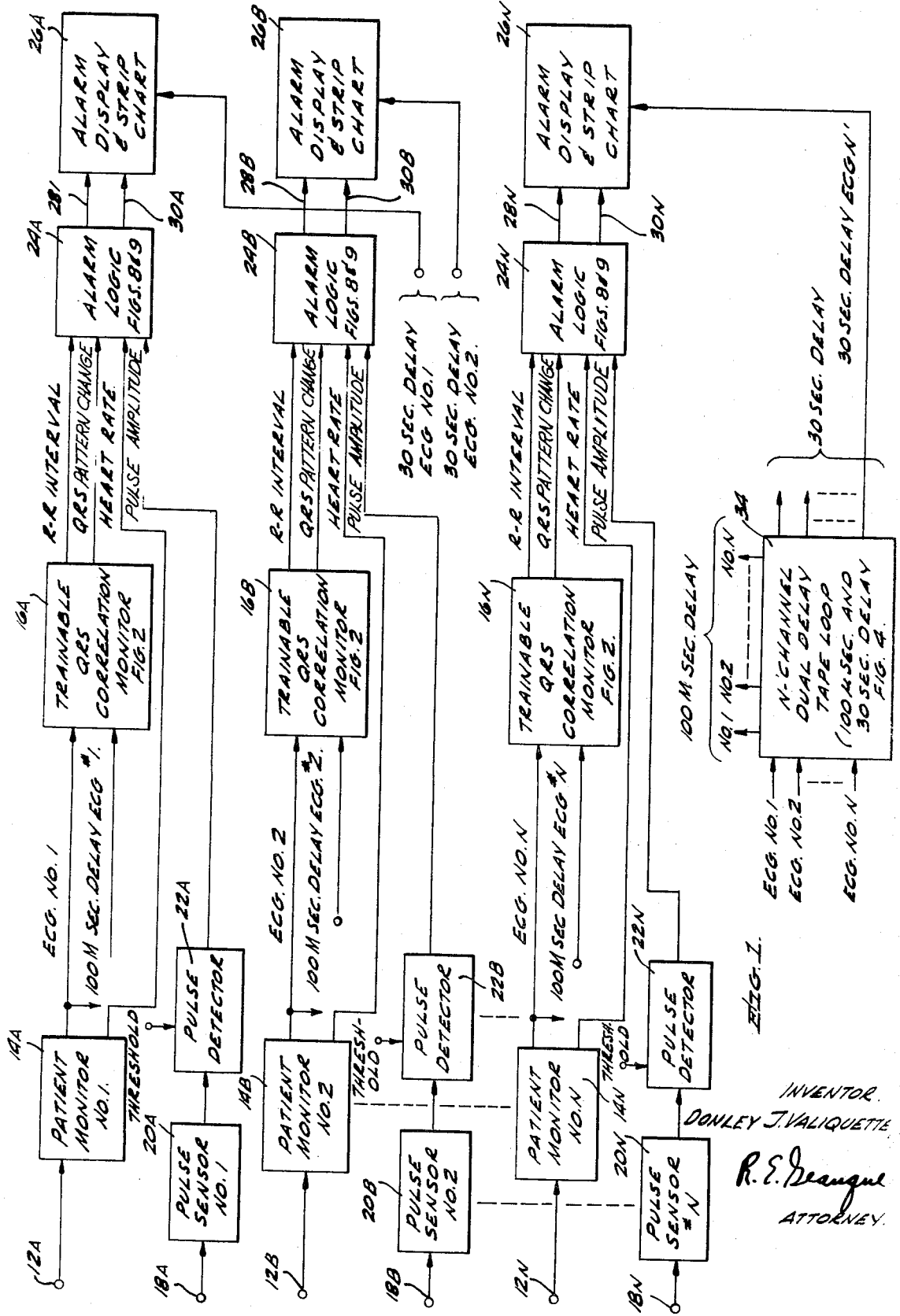

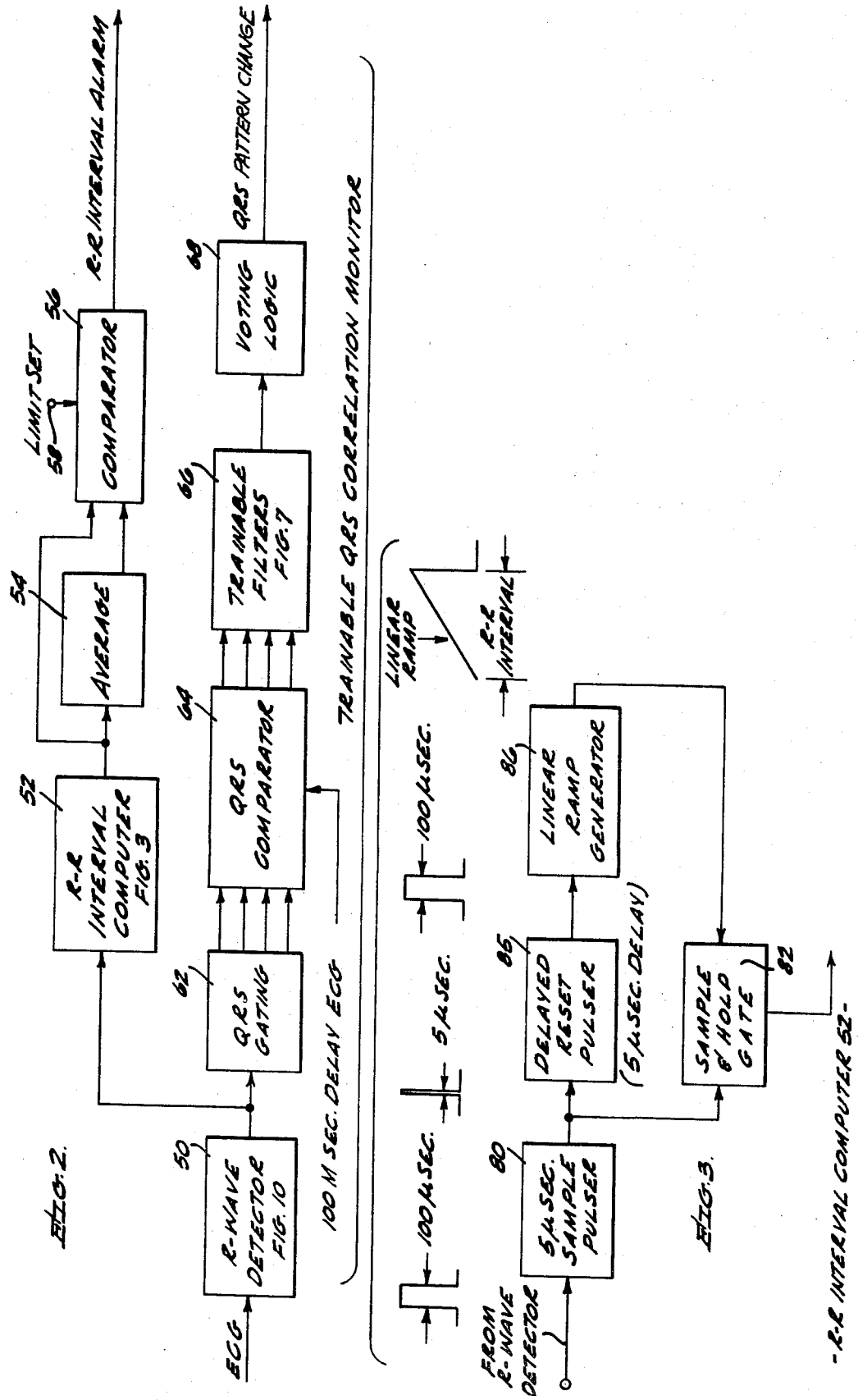

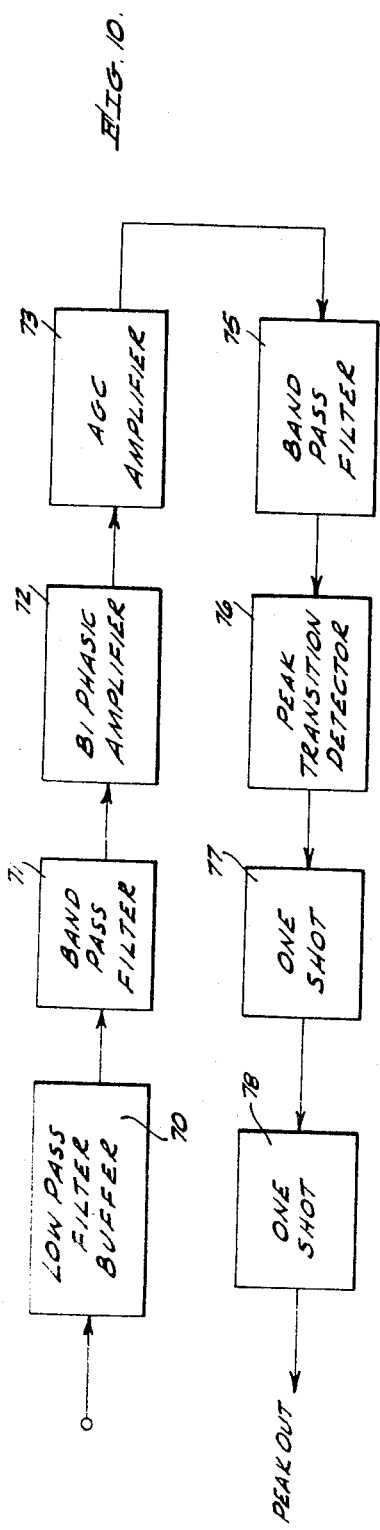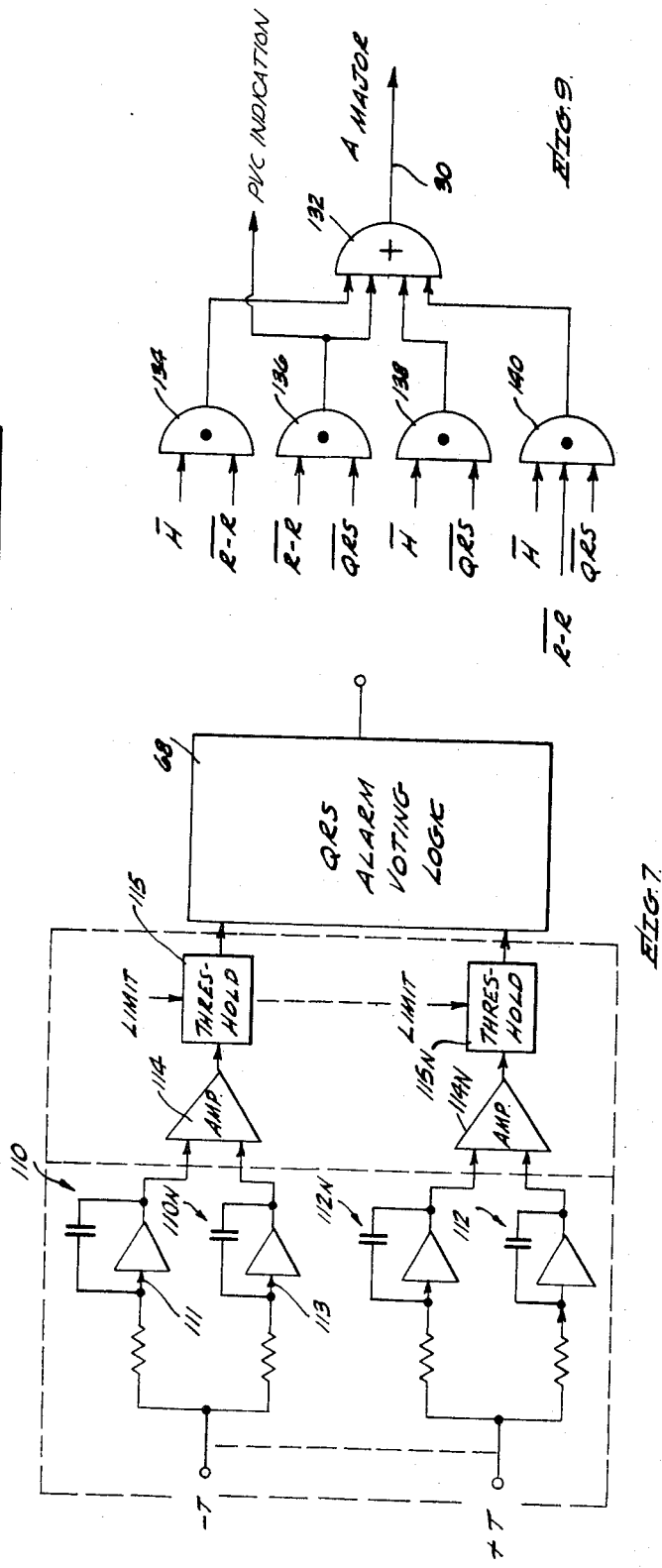

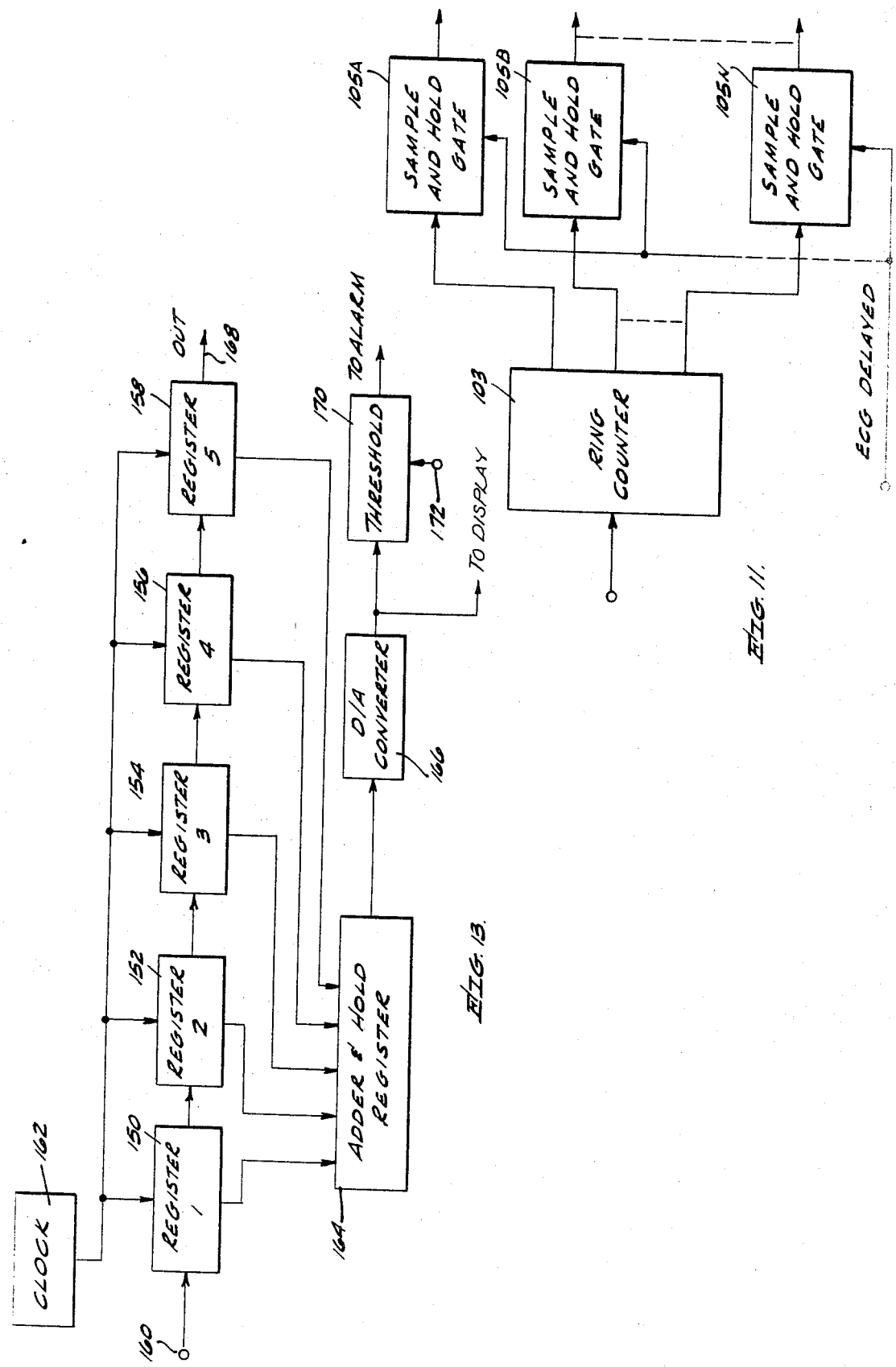

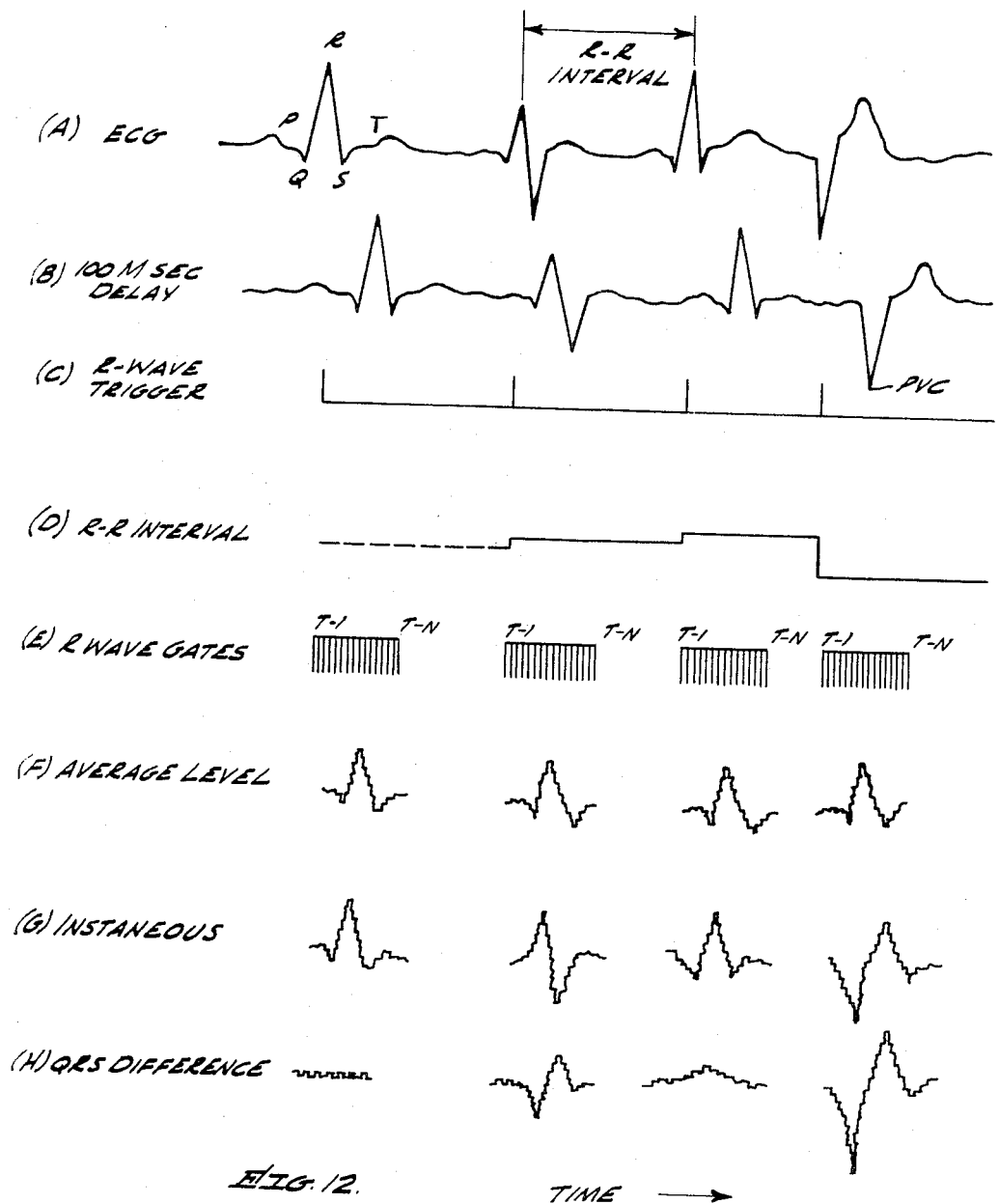

CARDIAC ARRYTHMIA DETECTOR

CROSS-REFERENCE TO CO-PENDING APPLICATION

This is a divisional application of abandoned application Ser. No. 791,638, filed January 16, 1969, for Cardiac Arrhythmia Detector, Donley J. Valiquette, Inventor and assigned to the same assignee.

BACKGROUND OF THE INVENTION

1. Field of the Invention

This invention relates to cardiac arrhythmia detectors and more particularly to novel and improved apparatus which detects changes in various conditions in heart patients and sounds an alarm condition when certain criteria is present.

2. Background of the Prior Art

Heretofore, prior art cardiac monitors were comprised of an oscilloscope and a cardiotachometer located substantially near the cardiac patient. Leads from the instrument to electrodes on the patient sensed the patient's electrocardiogram waveform (hereinafter referred to as ECG) and displayed this data on the oscilloscope. The heart rate is computed from the ECG and displayed by the cardiotachometer. The most common alarm used in this system is a simple upper and lower limit of heart rate. These prior art systems have a basic disadvantage in that although they do detect some significant events, a numerous amount of false alarms occur. Thus, with the personnel monitoring these types of instruments, they become accustomed to the numerous amount of false alarms and hence have a lack of a sense of urgency when an alarm does sound.

More complex computer alarm systems may be used to provide alarms on abnormal QRS durations and other arrthymias, but these are generally guite expensive and not economically feasible for installation of several beds. Further in the prior art, analysis of electrocardiogram implementation of meaningful analysis technique for cardiac monitoring has been provided and they vary in types of analysis and complexity of analysis techniques. The more recent detailed electrocardiogram analysis are almost exclusively done with the use of digital computers. While digital computers offer tremendous advantage in obtaining more accurate and more complete electrocardiographic interpretations in less time than required by other techniques, they are quite costly and do not provide an economically feasible method for use with nonresearch cardiac care monitoring systems.

It has been found that certain criteria provide alarm conditions for patients in the cardiac ward care, or the like. If these alarm criteria appear, medical action should be taken immediately with the patients. These criteria are as follows:

| Parameter | Alarm Criteria | Rationale |
|---|---|---|
| Heart Beat Rate | High | (High to detect tachyarrhythmias) |
| | Low | (Low to detect bradyarrhythmias |
| R-R Interval compared to the average of the previous twelve. | High then Low | (To dtect premature ventricular contractions) |
| QRS Pattern | Long or Short QRS Duration | (Long to detect bundle branch block, ventricular rhythm or abberration) |
| | | (Short to detect artificial heart rate timing stimulus not followed by a QRS) |
| R Wave Inversion | | (To detect premature ventricular contractions) |
| Heart Mechanical Action (Peripheral Pulse) | No or Low Pulse | (To detect electromechanical disassociation) |

The basic measurement in the alarm sentry system for the alarms is the R-R interval, the QRS pattern change and the heart mechanical action.

BRIEF DESCRIPTION OF THE INVENTION

Briefly described, the present invention provides a cardiac arrhythmia detector which detects alarm conditions of the aforementioned alarm criteria. A plurality of patient monitors are provided and provides the electrocardiogram output of QRS complex signals from each patient being monitored. The QRS complex is delayed by an N channel dual delay tape loop which delays the signal for a predetermined time on one output and a second delay of a longer time, typically 100 milliseconds on the short time and 30 seconds on the long delay. An R wave peak detector is provided for detecting the R peaks of the QRS complex signals. Means are coupled to the R wave detector for the detecting abnormal conditions between R intervals of QRS complex provided by the patient monitors. Means are provided for continuously comparing the current QRS complex with a stored waveform indicative of the running average of several preceding QRS complexes. A pulse sensor is coupled to the patient and a pulse detector having a predetermined threshold limit provides an indication of mechanical action of the heart. The R-R interval signal and the QRS pattern change signal, the heart rate, and pulse signal are provided to logic means which detect a major alarm when a number of predetermined inputs are in a certain condition, and a minor alarm output when any one of the inputs is of a predetermined condition. These alarm output signals are provided to an alarm display and during an alarm condition a strip chart record of the 30 second delayed ECG is initiated. This permits the events prior to the alarm to be recorded.

It, therefore, becomes one object of this invention to provide a novel and improved system for monitoring cardiac patients and to sound an alarm when predetermined conditions are detected.

Another object of this invention is to provide a novel and improved unit system designed to provide more reliable alarm conditions than currently available in existing cardiac care units.

Another object of this invention is to provide a system which will supplement existing systems by monitoring other key parameters of the electrocardiogram signals which includes the R-R interval rhythms and the QRS complex pattern change signals.

DESCRIPTION OF THE DRAWINGS

These and other objects, features and advantages will become apparent to those skilled in the art when taken into consideration with the following detailed description wherein like reference numerals indicate like and corresponding parts throughout the several views and wherein:

FIG. 1 is a block diagram of a preferred embodiment of this invention;

FIG. 2 is a block diagram illustrating the trainable QRS correlation monitor, as shown in FIG. 1 of this embodiment;

FIG. 3 is a block diagram illustrating the R-R interval computer used in the embodiment shown in FIG. 1;

FIG. 7 illustrates the trainable filters of the QRS correlation monitors, shown in FIG. 1, of the preferred embodiment of this invention;

FIG. 9 illustrates logic block diagrams for providing a major alarm output signal;

FIG. 10 is a block diagram illustrating the R wave peak detector used in the embodiment shown in FIG. 1;

FIG. 11 is a block diagram of the QRS gating and comparator shown in FIG. 1;

FIG. 12 is a graph showing various waveforms at various points of the embodiment shown in FIG. 1; and FIG. 13 is a block diagram illustrating apparatus for aberrant beat detection.

DESCRIPTION OF THE PREFERRED EMBODIMENT

Figure 4:
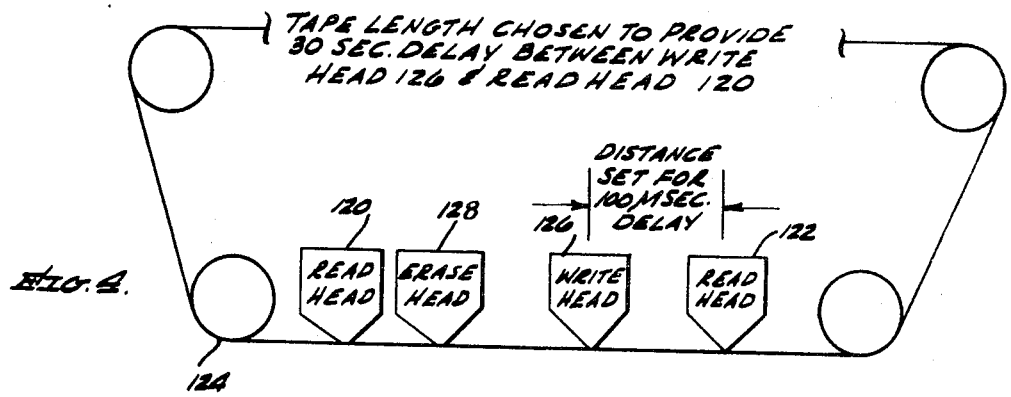
FIG. 4 illustrates a tape system and its associated read/record heads used in the delay channels shown in FIG. 1.

Turning now to a more detailed description of this invention, there is shown in FIG. 1 a preferred embodiment of this invention. A plurality of input probes 12A, 12B – 12N are provided to register several patients' electrocardiogram waveforms (hereinafter referred to as ECG). These probes 12A, 12B – 12N may be in the form of electrodes. These ECG signals are monitored by the patient monitors 14A, 14B – 14N.

As is well known to those skilled in the art, ECG signals provide a complex of waveforms, as best shown in Graph (A) in FIG. 12, and each segment of the waveform has a predetermined reference letter which is used throughout the medical profession. As shown in Graph (A) of FIG. 12, the ECG signal has letter terms attached to their segments referred to as P, Q, R, S, T on each complex of signals. Most reliable information as to the cardiac patient's condition can be determined by the QRS complex, and it will be these signals that will be used throughout this embodiment to determine the cardiac patient's condition along with other signals hereinafter discussed. The output signal from the patient monitors 14A, 14B – 14N, are applied to trainable QRS correlation monitors 16A, 16B – 16N, wherein various computations are made of the ECG signal, for example, the interval between the R intervals of the QRS signals are determined, hereinafter referred to as the R-R interval. This can best be explained by reference to FIG. 12 wherein the ECG signals are provided and the R-R intervals are detected by measuring the distance between peak to peak of the QRS complexed, as shown in Graph (D) of FIG. 12.

A further output of the trainable QRS correlation monitors 16A, 16B – 16N, is the QRS pattern change. Thus, the trainable QRS correlation monitor 16A, 16B – 16N provide an output if the QRS complex signals, as shown in Graph (A) of FIG. 12, differ to any significance in pattern. The patient monitors 14A, 14B – 14N also provide the heart pulse rate in a manner well known to those skilled in the art, and if the rate exceeds a predetermined limits, a heart rate alarm pulse is provided.

Further information is provided by the pulse sensor (photo plethysmograph) 20A, 20B – 20N and are applied directly to the pulse detectors 22A, 22B – 22N respectively. A pulse detector 22A, 22B – 22N provides an output signal, hereinafter referred to as pulse, if the pulse is above a predetermined threshold. This pulse detector is well known to those skilled in the art and provide an output if the pulse detected by the pulse sensor 20A through the electrode 18A is over a predetermined threshold level.

The R-R interval signal, QRS pattern change signal, heart rate signal and pulse signal are applied to alarm logic 24A, 24B – 24N, wherein certain criteria on these input signals provide two outputs to the alarm display and strip chart 26A, 26B – 26N. The alarm logic provides an output on the lead 28A, 28B – 28N if any of the inputs meet a certain criteria which will indicate a major alarm. An output is provided on the lead 30A, 30B – 30N if the inputs are of a different criteria to indicate a minor alarm. The alarm logic 24A, 24B – 24N will be explained in more detail in connection with FIGS. 8 and 9.

Further, the ECG No. 1, ECG No. 2 – ECG No. N provided from the patient monitors 14A, 14B – 14N respectively, are applied to an N channel, dual delay tape loop 34. In this tape loop the signals are stored and delayed for two different time periods, one of them being a 100 millisecond delay on output channels ECG No. 1, ECG No. 2 – ECG No. N and applied to the trainable QRS correlation monitors 16A, 16B – 16N, respectively. The signals are then delayed for a 30 second delay and the output signals ECG No. 1, ECG No. 2 – ECG No. N are applied to the alarm display and strip chart 16A, 16B, 16N respectively. Thus, the delay signals are used in the operation of the trainable QRS correlation monitors, as will be described in more detail with reference to FIG. 2, and the 30 second delay ECG signals are used for analysis of the ECG signals prior to the alarm.

With reference now to FIG. 2, there is shown in block diagram the trainable QRS correlation monitor 16. The ECG signal from the patient monitor 14 is applied to an R wave detector 50. The R wave detector 50 may be a peak detector, as shown in FIG. 10, and will be described hereinafter. The purpose of the R wave detector 50 is to detect the peak of the R wave of the QRS complex. When this R signal is detected, it is applied to an R-R interval computer 52. The R-R interval computer 52 is the type which may indicate a voltage analog which is proportional to the time difference between the R signal of one QRS complex and the R peak of a succeeding QRS complex. A typical R-R interval computer may be of the type that is shown in FIG. 3 and will be described with reference to that figure. The output of the R-R interval computer 52 is applied to an averager 54 which complies an average R-R interval voltage and provides it to a comparator 56. The average R-R interval is one which is averaged over a predetermined number of R-R intervals.

The output of R-R interval computer 52 is also applied directly to the comparator and is compared with the average R-R interval. The comparator 56 provides an output R-R interval alarm when there is a substantial difference between the R-R interval signal from the computer 52 and the average R-R interval provided by the averager 54. A further input is provided to terminal 58 from the associated alarm display and applied to the comparator to set a limit upon the averaged signal. Thus, by the apparatus and methods previously discussed, the R-R interval is provided and compared to the averages of, for example, 12 preceding intervals. Such will satisfy the alarm criteria if the alarm criteria shows that the R-R interval is low as compared to the prior ones, then it can be said that a premature ventricular contraction exists. The R-R interval alarm signal is applied to the alarm logic 24 to indicate, as previously mentioned, whether a major alarm should be sounded or a minor alarm. The R-R interval computer 52 provides an R-R interval average based on several beats and the comparator compares each new R-R interval to the average. If the difference exceeds the manual adjustment limits, as provided by the limits set to terminal 58 of the comparator, an alarm signal is thus generated.

Figure 6:
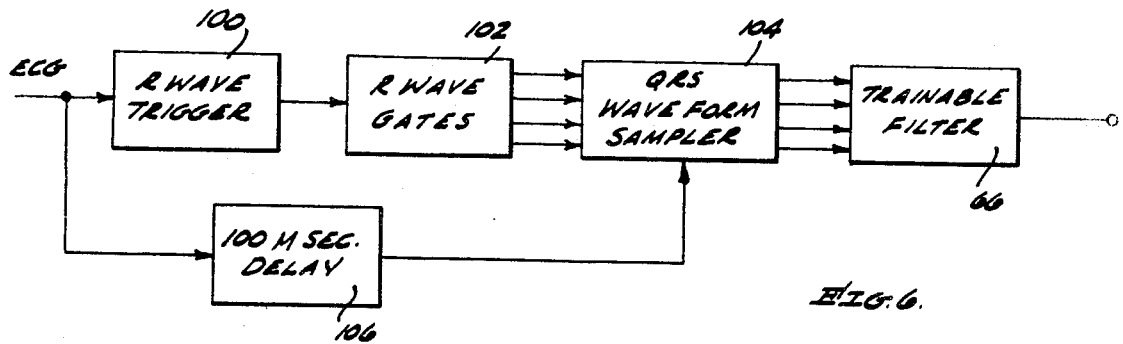
FIG. 6 is a further simplified block diagram of the trainable QRS correlation monitor.

The ECG signal after passing through the R wave detector is applied to the QRS gating 62. The QRS gating 62 quantizes the ECG signal in a synthetic cross correlation method as shown in FIG. 6. This is accomplished when the outputs of the QRS gating are applied to the QRS comparator 64. In this comparator 64 a waveform is overlayed on another waveform and the points of difference noted provides the basis for quantatively describing the difference in the pattern.

The system shown in FIG. 6 provides that comparing several points on each waveform to the stored average of the previous same several points on waveforms provides the basis for aberrant beat detection. This wave is essentially memorized by the correlation filters 66 and if the amplitude in each filter output, when plotted, represents the average of the previous N waveforms and represents the filter time constant factor. The outputs of the trainable filters are applied to voting logic 68 where the M out of N inputs, for example, may provide the QRS pattern change alarm. The voting logic 68 is of any typical type for providing the M out of N logic if done in digital form. An analog method for providing the voting logic could be an analog resistive summer and an integrator to perform the QRS pattern change alarm.

With reference now to FIG. 3, there is shown a typical R-R interval computer 52. The R-R interval computer is a time to voltage converter which emits an output voltage indicative of the time interval between R waves applied thereto. The R wave coincident pulse from the detector 50, shown in FIG. 2, is applied to a 5 microsecond sample pulser 80, which may be a monostable multivibrator or one-shot, and which provides an output signal of 5 microsecond signal. The pulser 80 is triggered on the leading edge of the waveform from the wave detector 50. The output of the sample pulser 80 is applied to a sample and hold gate 82 and also to a delayed reset pulser 85. The reset pulser 85 may be in the form of a multivibrator or one-shot which is delayed for a predetermined time and then reset on the next succeeding pulse. The output signal of the delayed reset pulser 85 starts a linear ramp generator 86 and the output of which is sampled by a sample and hold gate 82 at each pulse time from pulser 80. This is best shown in FIG. 12. The output of the sample and hold gate 82 is a beat-to-beat R-R interval analog voltage, which is a voltage having a value indicative of the R-R interval. In other words, the 5 millisecond pulse from pulser 80 serves two functions; first, it commands the sample and hold circuit 82 to sample and store the R-R interval data from the peak detector 50, and it also initiates the delayed reset pulse circuit 85. The R-R interval data is in the form of a linear ramp waveform which is initiated by the previous R trigger signal in the linear ramp generator 86. After the sample and hold function is accomplished (5 microseconds in this embodiment), a delay pulse is generated in the reset pulser circuit 84 to reset the linear ramp generator 86. The ramp continues until sampled and reset by the next R wave trigger pulse. The resultant output from the sample and hold circuit 82 is an accurate voltage analog directly proportional to the R-R interval.

With reference now to FIG. 10, there is shown a typical circuitry which comprises the R wave peak detector 50. The input ECG signal is applied to a low pass filter amplifier 70. This amplifier accepts the incoming ECG signal and attenuates any undesirable high frequencies that may be present. The output of the filter amplifier 70 is applied to a first bandpass filter 71 and, for example, this bandpass filter may have a center frequency of 17Hz. Since the frequency spectrum of a typical R wave has significant energy at approximately 17Hz, the bandpass filter passes the R waves more effectively reducing the effects of baseline wander, large T waveforms in the ECG complex, and other random noises. This filter is purposely made low Q for broader bandwidth. This improves the damping and reduces the gain of the center frequency so that large signals will not saturate the amplifier 70. The signal from the bandpass filter 71 is then applied to a biphasic amplifier 72, which has the characteristics of an absolute value circuit, thus permitting the input signals to be biphasic and to drive the succeeding stages with unipolar signals. This circuit is incorporated in case the R signal is inverted, as may be the case if, as shown in Graph (B) of FIG. 12 where a PVC signal is shown inverted. Thus, all signals passing to the biphasic amplifier 72 are unipolar signals and any signal that is in the negative, is reversed to the positive polarity.

The output of the biphasic amplifier 72 is applied to an automatic gain amplifier 73. Because of the fact that constant amplitude is vital if a voltage comparator is used to detect the signals, a typical circuit description of the automatic gain control amplifier is one shown in the IEEE transactions on Biomedical Engineering, Volume BME-13, No. 2, April, 1966, authored by P. F. Meagher, R. E. Jansen, M. H. Weil and H. Schubin.

Finally, the output of the gain control amplifier 73 is applied to a second bandpass filter 74. Again, the bandpass filter 75 is similar to the bandpass filter 71 to filter out extraneous noises. However, some of the restraints placed on the bandpass filter 71 may not apply because of the previous conditioning already set forth in these chain events to the signal.

The fact that the input amplitude is constant enables this state to have a higher Q than in the previous bandpass filter stage 71. The output of the bandpass filter 75 is applied to a peak transition detector 76. The purpose of the peak transition detector 76 is to detect negative transitions of the peak of the R wave. This circuit has approximately the unity gain for positive going signals and an open loop gain of several tens of thousands for negative going signals. Action of this circuit of the peak transition detector 76 is to follow the positive excursion to the peak of the R wave. This peak value is held and becomes a reference for voltage comparison. As the R wave starts negative, the small change between the R wave peak and a declining signal is sensed by the peak transition detector 76. This causes the output of the peak transition detector to approach negative saturation in a rapid manner. The output of the peak transition detector 76 is applied to a monostable multivibrator, or one-shot 77. The one-shot 77 generates an adjustable width pulse, thus any undamped response in the filter or spurious signals cannot then be passed by the R wave peak detector output channel. The output of the one-shot 77 is applied to a second one-shot 78 and by the actions of the one-shot 77, no pulse can be generated to activate the one-shot 78, which is a 100 microsecond monostable multivibrator trigger generator. Such an inhibit feature is standard in most all cardiotachometers and is normally set for 250 milliseconds to prevent false triggering from T waves of the QRS complex and all rates up to 240 beats per minute. For this invention, the lockout time set to a value permits detection of all expected premature ventricular contractions. The one-shot 78 of the detector is a 100 millisecond monostable multivibrator which generates the trigger signal for the R-R interval computer and the QRS correlation monitor 64. The output of the one-shot 78 is then the peak of the R waveform of the QRS complex which is applied to the R-R interval computer 52, as previously described.

With reference now to FIGS. 6, 7, 11 and 12, there is shown the QRS correlation monitor in a more detailed form. When an R wave is detected by the R wave detector 50, the R wave trigger circuit 100 is enabled. The circuit 100 has an output circuit coupled to the R wave gates 102. The R wave gates may be a digital ring counter 103 which provides outputs, as shown in FIG. 12, for example. At the peak of the QRS complex of the ECG complex, as shown in FIG. 12, a plurality of output circuits are enabled by the R wave gates 102. From a minimum time −T to T=0, a 100 millisecond time has passed. These gate signals are applied to the QRS waveform sampler 104 which may be in the form of a plurality of sample and hold gates 105, as shown in FIG. 11, which sample and hold a waveform at each gate period provided by the R wave gates 102. The signal which is sampled and held is the 100 microsecond delayed signal by the delay 106 which may be provided by the N channel dual delay tape loop 34, shown in FIG. 1. Thus, at each particular gate time, the signal previously delayed 100 milliseconds, as shown in Graph (B) of FIG. 12, is sampled and held and applied to the trainable filters at gate times as provided by the R wave gates 102. With reference to FIG. 11, there is shown a ring counter 103 which is enabled by the R wave trigger 50. The ring counter 103 then emits a plurality of spike signals, as shown in Graph (E) of FIG. 12. The outputs of the ring counter 103 is applied to trigger a plurality of sample and hold gates 105A, 105B – 105N in a sequential manner. Also applied to the sample and hold gates 105A, 105B and 105N is the delayed ECG waveform. Thus, at each gate time from the ring counter 103 a segment of the ECG complex is stored in a sample and hold gate amounting to one segment in −T or +T times, as shown in Graph (F) in FIG. 12. Comparing each waveform to the stored average of the previous wave provides the basis for aberrant beat detection. The waveform is essentially memorized by the correlation filters 66, as shown in FIGS. 2 and 7. If the amplitude in each filter output, when plotted, represents the average of the previous N waveforms, as shown more Graph (F) of FIG. 12, N wave represents the filter time constant factor.

With reference again to FIG. 6, the R wave trigger circuit 100 is a peak transition type, as previously described. The 100 millisecond delay 106 is being provided by an additional playback head on the tape loop memory, as shown and described in connection with FIG. 4. The QRS waveform sampler 104 measures and stores the amplitude of the waveform at the end of each gate period provided by the R wave gates 102. The time relations are as shown in FIG. 12. This process can be described as quantizing the waveform. The trainable filters 66 are shown in more detail in FIG. 7. The trainable filters comprise storage devices 110 −110N and 112 −112N for each gate trigger provided by the R waveform gates TI − TN from gate 102, as shown in Graph (E) of FIG. 12, whereby storage devices represent a time constant for each waveform sample. Each storage device may comprise of an integrator 111 and 113 whereby integrator 111 has a long time constant and integrator 113 has a very short or at least sample and hold time constant. The time constant provided by storage device 110 represents the designed averaging period for the waveform segment and the second storage device 112 represents the instantaneous segment amplitude from one QRS complex to the next. A high gain comparator, in the form of a high gain differential amplifier 114, is provided to sense the difference between the instantaneous and the average values from integrators 111 and 113.

A threshold circuit 115 − 115N is coupled between the amplifiers 114− 114N and the QRS alarm voting logic. An appropriate limit to the threshold circuit 115 for the allowable difference should be established considering the actual clinical waveforms. The output signal of the high gain differential amplifiers 114 − 114N are applied to the QRS voting logic 68. The QRS voting logic could be of the type which can be, in digital form, M out of N logic or in analog form comprising a plurality of resistive summing networks and an integrator output and well known to those skilled in the art. The QRS voting logic samples the different levels of each trainable filter and sums them on an absolute value basis to establish a correlation factor. The output from any one filter can be weighed relative to the other outputs as a basis for recognizing waveform difference. A single alarm limit will be established in the QRS alarm voting logic to simplify the limit setting.

Figure 5:
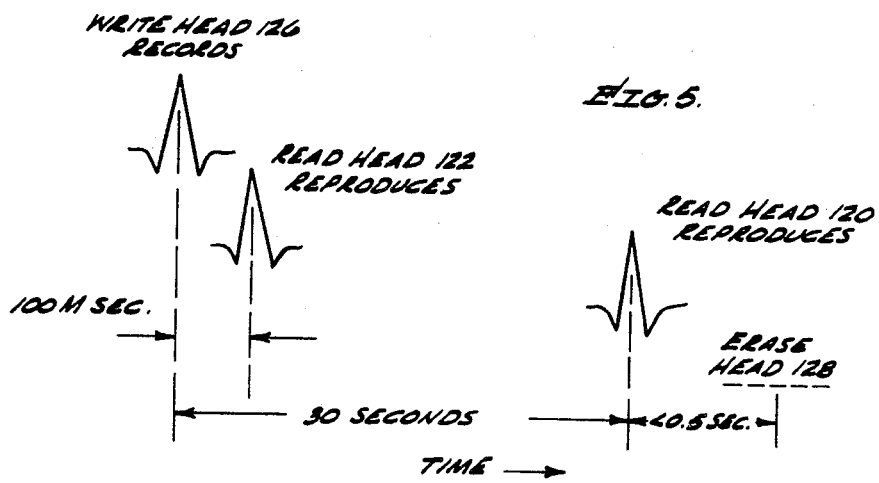
FIG. 5 illustrates the write-read-erase sequence for a single event as provided by the tape unit shown in FIG. 4.

With reference now to FIGS. 4 and 5, there is shown the tape delay configuration of the N channel dual delay tape loop in FIG. 1. The recording/reproducing equipment shown in FIG. 4 will provide both the 30 seconds of prior ECG data and the 100 milliseconds of delay required for the QRS monitor 16, and as specifically applied to the QRS wave sampler 104, shown in FIG. 6. A pair of read heads 120 and 122 are positioned to read the ECG signals on the tape 124 as recorded by the write head 126. The frequency response of each read reproduced channel should be at least equal to the data bandwidth of recorded ECG waveform. In this embodiment, a typical example could be 0.2 to 100 Hz. The required tape speed for achieving 100 milliseconds delay demands that the record and reproduce heads 120, 122 and 126, respectively, tape length is chosen to provide a 30 second delay between the write head 126 and the read head 120. In the spacing of the read head 122 and the write head 126 is a distance set for the 100 microsecond delay. This can be shown in the graphic illustration of FIG. 5. An erase head 128 is provided for periodically erasing of the data recorded on the tape at predetermined intervals.

Figure 8:
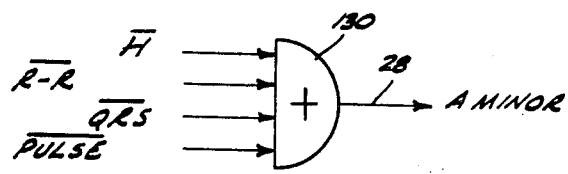
FIG. 8 illustrates the logic block diagrams for a minor alarm output.

Alarm logic 24A-24N, as shown in FIG. 1, is best described in FIGS. 8 and 9 and can be accomplished by the following equation set forth in well known Boolian algebraic techniques:

$A_{(minor)} = \overline{H} + \overline{R\text{-}R} + \overline{QRS} + \overline{Pulse}$ $A_{(major)} = (\overline{H} \cdot \overline{R\text{-}R}) + (\overline{R\text{-}R} \cdot \overline{QRS}) + (\overline{H} \cdot \overline{QRS}) + (\overline{H} \cdot \overline{R\text{-}R} \cdot \overline{QRS})$ where:

$A_{(minor)}$ = a minor alarm
$A_{(major)}$ = a major alarm
$\overline{H}$ = heart rate out of limit
$\overline{R\text{-}R}$ = R-R interval out of limit
$\overline{QRS}$ = QRS pattern change out of limit
$\overline{Pulse}$ = no indication of mechanical heart action With reference now to FIG. 8, there is shown a logic diagram to implement the $A_{minor}$ equation, where an OR gate 130 is provided and has an input signal $\overline{H}$, an input signal $\overline{R\text{-}R}$, and input signal $\overline{QRS}$, or an input signal $\overline{Pulse}$, wherein any of these inputs are present, the $A_{minor}$ output 28 will be enabled. With reference to FIG. 9, an $A_{major}$ output 30 will be enabled when the OR gate 132 is enabled. OR gate 132 is enabled by an AND gage 134 of an AND gate 136 or an AND gate 138, or an AND gate 140. AND gate 134 is enabled by an $\overline{H}$ signal and an $\overline{R\text{-}R}$ signal. AND gate 136 is enabled by an $\overline{R\text{-}R}$ signal and a $\overline{QRS}$ signal. AND gate 138 is enabled by an $\overline{H}$ signal and a $\overline{QRS}$ signal. And finally, AND gate 140 is enabled by an $\overline{H}$ signal, an $\overline{R\text{-}R}$ signal and a $\overline{QRS}$ signal. OR gate 130 is enabled, indicating a minor alarm of the patient being monitored, when any one of the signals set forth is present, an $A_{major}$ signal is presented to the alarm display 36 when a combination of the events is present at any one time, indicating a major alarm has taken place.

The alarm display will provide a limit set for each patient, alarm status light, a strip chart recorder, alarm reset switched, and audio alarm, or the like. A reset for both major and minor alarm is provided. Major alarms will only be utilized for a major alarm condition. An audio alarm enabled switch is provided to squelch the audio, particularly during the initial turn-on. During the training period for the filters, an alarm condition will be generated. This condition will only occur for a few seconds during the initial turn-on or after changing an electrode.

With reference now to FIG. 13, there is shown a circuit for aberrant beat detection which includes a plurality of serially coupled 3 bit shift registers 150, 152, 154, 156 and 158. An input terminal 160 is coupled to receive input pulses from the PVC detector 136 (FIG. 9).

A clock pulse from a clock 162 shifts a new pulse from the input terminal 160 into the first shift register 150. All other data stored in shift registers 150 - 158 are shifted right. The data in the last register is shifted out.

The output terminals of the shift registers 150 - 158 are coupled to an adder and hold register 164 which sums and accumulates the pulses from all shift registers 150 - 158. The digital sum accumulated in adder and hold register 164 is applied to a digital-to-analog converter 166 where an analog value is made available which represents the history of aberrant beats over a predetermined period of time. This value is displayed and applied to a threshold detector 170 where it is compared to a threshold value applied to an input terminal 172. If the value from the digital-to-analog converter exceeds the threshold level an alarm is sounded.

In practice, the output pulses of clock 162 are at 12 second intervals. This allows the counter circuit to count PVC's per minute and updating the count at each 12 second interval. The output to threshold detector 170 is always the accurate value of the PVC count with checks of the patient made each 12 seconds, whereby the value therein is updated.

Having thus described one preferred embodiment of this invention, what is claimed is:

1. A system for accumulating aberrant beat values of a cardiac patient comprising:

first means for detecting spatial changes in a train of electrocardiogram waveforms and for providing an output pulse when a spatial change is detected;

a plurality of serially coupled shift registers, the first shift register of said plurality being coupled to said first means, each shift register of said plurality having an output circuit;

an accumulator coupled to each output circuit of each shift register of said plurality to accumulate and store the contents thereof; and second means coupled to each shift register of said plurality to serially shift a new pulse into the first shift register of said plurality and for serially shifting the contents of each shift register of said plurality at predetermined intervals.

2. The system as defined in claim 2 and further comprising:

a digital to analog converter responsive to the accumulated contents of said accumulator; and a threshold detector responsive to said digital to analog converter and including a threshold input source, said threshold detector being to provide an output signal when the analog valve of the accumulator contents exceed the threshold input.

3. A system for monitoring the cardiac condition of a patient, comprising:

a monitor, responsive to the cardiac condition of the patient and including means for providing ECG signals;

detector means for processing said ECG signals to provide trigger pulses synchronized to a predetermined portion of said ECG signals;

means for storing said ECG signals for a predetermined fixed time interval and for providing delayed ECG signals;

quantizing means synchronized by said trigger pulses for quantizing the QRS complex portion of said ECG signals, and for providing quantized QRS signals indicative of the value of the respective quantized segments;

filter means coupled to said quantizing means for forming the time weighted average value of the quantized QRS signals for the respective segments;

comparison means for comparing said quantized QRS signals to their respective time weighted average value, and for providing a pattern change signal if differences therebetween exceed a preselected value; and alarm means responsive to said pattern change signal, for providing an alarm signal.

4. The system of claim 3 further comprising:

temporary storage means for storing the ECG signals for a second predetermined interval; and permanent storage means coupled to said temporary storage means and enabled by said alarm signal, for permanently recording said ECG signals; whereby said permanent storage means records ECG signals which occurred during said second predetermined interval prior to said alarm signal.

5. The system of claim 3 wherein:

said detector means includes peak detector means for providing said trigger pulses in synchronization with the peak level of each QRS complex.

6. The system of claim 5 wherein said peak detector means comprises:

a low pass filter buffer amplifier responsive to the ECG signals from said monitor;

a first bandpass filter coupled to said low pass filter;

a biphasic amplifier coupled to said first bandpass filter and adapted to invert negative portions of the QRS complex to provide positive output signals therefrom;

an automatic gain control amplifier responsive to the output signals from said biphasic amplifier;

a second bandpass filter responsive to the output signals from said automatic gain control amplifier;

a peak transition detector responsive to the peak of the output signals from said second bandpass filter; and pulse forming means for providing said trigger pulses in response to the output signals from said peak transition detector.

7. The system of claim 3 wherein:

said comparison means includes means for forming difference signals indicative of the difference between respective ones of said quantized QRS signals and their time weighted average values; and means for combining said difference signals to form a composite difference signal; and means for producing said pattern change signal when said composite difference signal exceeds a preselected value.

8. The system of claim 3 further comprising:

means for determining the interval between said trigger pulses and for providing an R-R interval signal indicative thereof;

means for forming the time weighted average value of said R-R interval signals and for providing an average R-R interval signal indicative thereof; and means for comparing said R-R interval signal against said average R-R interval signal, and for providing an R-R interval change signal when the difference therebetween exceeds a preselected value.

9. The system of claim 8 wherein:

said detector means includes peak detector means for providing said trigger pulses in synchronization with the peak level of each QRS complex, and said peak detector means comprises:

a low pass filter buffer amplifier responsive to the ECG signals from said monitor;

a first bandpass filter coupled to said low pass filter;

a biphasic amplifier coupled to said first bandpass filter and adapted to invert negative portions of the QRS complex to provide positive output signals therefrom;

an automatic gain control amplifier responsive to the output signals from said biphasic amplifier;

a second bandpass filter responsive to the output signals from said automatic gain control amplifier;

a peak transition detector responsive to the peak of the output signals from said second bandpass filter; and pulse forming means for providing said trigger pulses in response to the output signals from said peak transition detector.

10. The system of claim 8 further comprising:

means for producing an alarm signal upon the occurrence of a pattern change signal and an R-R interval change signal.

11. The system of claim 10 further comprising:

temporary storage means for storing the ECG signals for a second predetermined interval; and recording means coupled to said temporary storage means and enabled by said alarm signal for recording said ECG signal; whereby ECG signals which occur during said second predetermined interval preceding said alarm signal are recorded.

12. The system of claim 8 wherein:

said monitor means further includes means for providing a signal indicative of the heart rate of the patient; and said system further comprises means for providing a heart rate alert signal when said heart rate signal is outside of a preselected range, and means for producing an alarm signal in response to a predetermined combination of said pattern change, R-R interval change and heart rate alert signals.

13. The system of claim 8 wherein:

said monitor means further comprises means for providing a signal indicative of the heartrate of the patient; and said system further includes means for providing a heart rate alert signal when said heart rate signal is outside of a preselected range; means for detecting a low pulse level and for providing a pulse level alert signal indicative thereof; and means for producing an alarm signal in response to a predetermined combination of said pattern change, R-R interval change, heart rate alert and pulse level alert signals.

14. The system of claim 13 further comprising:

means for producing a minor alarm signal upon the occurrence of any one of said pattern change, R-R interval change, heart rate alert and pulse level alert signals; and means for providing a major alarm signal upon the occurrence of any two of said pattern change, R-R interval change and heart rate alert signals.

15. A system for monitoring the cardiac condition of a patient in response to ECG signals applied thereto, said system comprising:

detector means for processing said ECG signals to provide a trigger pulse in synchronization with a predetermined portion of each ECG signals;

means for storing said ECG signals for a predetermined time interval and for providing delayed ECG signals;

means synchronized by said trigger pulses, for quantizing said delayed ECG signals and for providing pattern segment signals indicative of the pattern of each ECG signal;

means for forming the time weighted average of corresponding pattern segment signals;

means for producing a pattern change signal as a function of the difference between said segment signals and the corresponding time weighted average value thereof; and alarm means, responsive to said pattern change signal, for providing an alarm signal.

16. The system of claim 15 wherein:

said means for producing a pattern change signal includes means for forming difference signals indicative of the difference between respective ones of said pattern segment signals and their corresponding time weighted average value; and means for combining said difference signals to form a composite difference signal and means for producing said pattern change signal when said composite difference signal exceeds a preselected value.

17. The system of claim 15 wherein:

said detector means includes peak detector means for providing said trigger pulses in synchronization with the peak level of each QRS complex of each ECG signal.

18. The system of claim 17 wherein said peak detector means comprises:

a low pass filter buffer amplifier responsive to the ECG signals from said monitor;

a first bandpass filter coupled to said low pass filter;

a biphasic amplifier coupled to said first bandpass filter and adapted to invert negative portions of the QRS complex to provide positive output signals therefrom;

an automatic gain control amplifier responsive to the output signals from said biphasic amplifier;

a second bandpass filter responsive to the output signals from said automatic gain control amplifier;

a peak transition detector responsive to the peak of the output signals from said second bandpass filter; and pulse forming means for providing said trigger pulses in response to the output signals from said peak transition detector.

19. The system of claim 15 further comprising:

temporary storage means for storing the ECG signals for a second predetermined interval; and permanent storage means coupled to said temporary storage means and enabled by said alarm signal, for permanently recording said ECG signals; whereby said permanent storage means records ECG signals which occurred during said second predetermined interval prior to said alarm signal.

20. THe system of claim 15 further comprising:

means for determining the interval between said trigger pulses and for providing an R-R interval signal indicative thereof;

means for accumulating the time weighted average value of said R-R interval signals and for providing an average R-R interval signal indicative thereof; and means for comparing said R-R interval signal against said average R-R interval signal, and for providing an R-R interval change signal when the difference therebetween exceeds a preselected value.

* * * * *